2,912,284

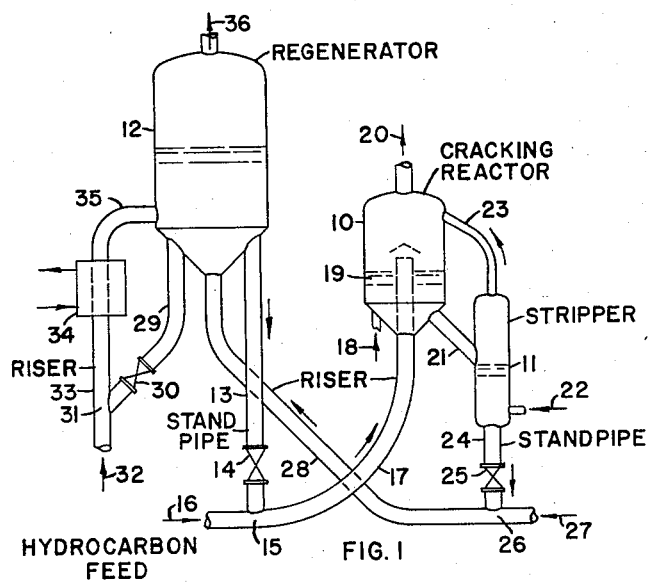
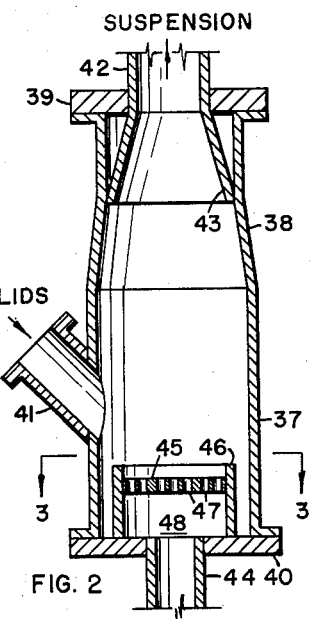
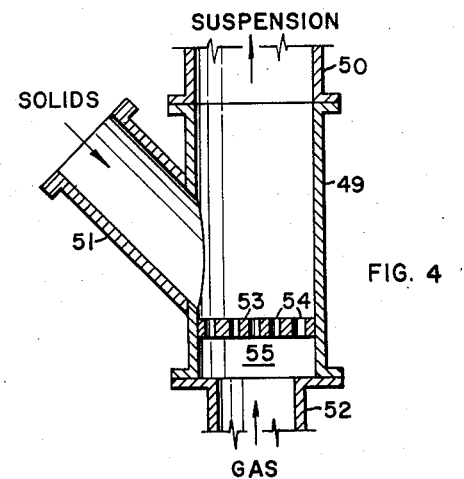
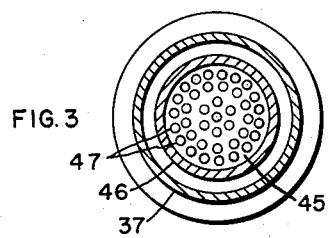
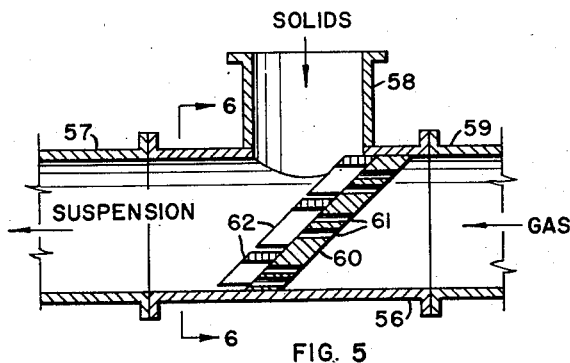
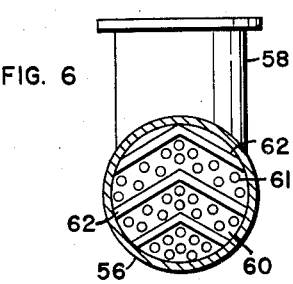
INVENTORS:
ROBERT M. CASAGRANDE
RODOLPHE L. MOTARD
CHARLES O. REED, JR.
THEIR ATTORNEY

United States Patent Office 2,912,284
Patented Nov. 10, 1959

ENGAGING FINELY-DIVIDED SOLIDS WITH A CONVEYING GAS

Robert M. Casagrande, Metairie, La., and Rodolphe L. Motard, Houston, and Charles O. Reed, Jr., Pasadena, Tex., assignors to Shell Development Company, New York, N.Y., a corporation of Delaware Application April 21, 1958, Serial No. 735,078

8 Claims. (Cl. 302—53)

The invention relates to the art of transporting finely-divided solids or pulverulent material, such as catalyst or sand, through a horizontal, inclined or vertical transport duct by means of a solids-conveying gas stream, the term "gas" being used generically herein to include vapors, such as hydrocarbon vapors that undergo a chemical change upon being brought into contact at suitable temperature with such solids, as well as steam, air, nitrogen, hot combustion products, or the like. More particularly, the invention is concerned with that element of the transport system which is used to charge the finely-divided solids into the gas stream, herein called the engagement device.

Engagement devices, including a confined engagement chamber to which the solids and the gas stream are supplied separately, are often integral parts of plants for the catalytic conversion of hydrocarbon oils and are used therein for elevating pulverulent catalytic material from the bottom of a standpipe to an elevated reactor and/or separator through an ascending transport duct which may, in some instances, itself function as a reaction chamber, as when the gas is or contains the reactant. (See the U.S. patent to Ewell, No. 2,663,675.) They are also used in tubular heaters of the type using heat-retentive solids such as sand which are elevated by hot combustion gas. (See U.S. patent to Schoenmakers et al., No. 2,698,171.) When the transport duct emerges upwardly (vertically or inclined) from the top of the engagement chamber the latter is often called a lift pot. When the transport duct emerges horizontally from the side it may follow an upward curve, as in the Ewell patent.

Since the solids-conveying gas stream must be supplied under pressure, which is often generated by power-driven equipment, it is desirable for reasons of economy to keep the pressure drop through the engagement zone as low as possible; the engagement zone is the space through which the resulting suspension flows and extends for a distance of several feet downstream from the point at which the solids are engaged, including a part of the transport duct. Engagement devices of various known designs have the drawback of giving excessive pressure drops in the engagement zone, believed to be caused by non-uniform acceleration of the solid particles within the engagement chamber, due to irregular engagement of the solids by the gas. Another consequence of such high pressure drops is that a tall standpipe for feeding the solids from the reactor-like vessel to the engaging chamber (or a high bed level in the reactor) is required to attain a pressure balance which will insure flow of solids by meeting the requirement that the solids must be charged from the bottom of the standpipe at a pressure at least as high as that in the engaging chamber.

Included among the known designs considered in the preceding paragraph are those wherein the gas is fed into the engagement chamber through a confined jet tube to produce a high-velocity gas jet having a flow area small in relation to the transport duct (known as the nozzle type), those in which the entrance to the transport duct is fitted with a convergent-divergent section into the throat of which the gas is directed by a jet element to form an eductor (known as the eductor type), and those consisting of a T-fitting, wherein solids are fed transversely to a gas stream (known as the T-type).

It is the main object of this invention to provide an improved device for engaging finely-divided solids with a gas stream, wherein the pressure drop in the engagement zone is reduced, whereby power losses in transporting the finely-divided solids are reduced.

Ancillary thereto, it is an object to improve the pressure balance as was noted above, thereby attaining greater flexibility in the operation of existing plants and permitting new plants to be designed with lower heights.

Further objects will become apparent from the following description:

The main object is attained according to the invention by supplying the solids through a solids inlet into an enclosed engagement chamber having the transport duct and the gas inlet duct connected at opposite sides and substantially in alignment with each other and providing means for distributing the gas flow substantially uniformly over a flow area approximately the same as that of the entrance to the transport duct; the latter may be equal to or somewhat greater than the area of the transport duct proper. The gas distributing means may be a diffusion plate placed across the gas inlet duct in the vicinity of the solids inlet, said plate containing restricted passages distributed over a flow area that is at least as large as the major part of the cross sectional area of the transport duct, e.g., from about one-half to twice the said cross sectional area, such as substantially equal to the said area, the passages being distributed and sized so as to insure essentially uniform flow of gas over the said area of distribution of the passages toward the transport duct. The diffuser obstructs between about 20% and 98% of the cross sectional area thereof, to create in the gas passing therethrough a pressure drop sufficient to distribute the gas substantially uniformly among the several passages over the composite flow area. The cross sectional area of the engagement chamber is about the same as or up to twice as great as the cross sectional area of the transport duct, being kept reasonably small to avoid uneven flow, insure a sufficient gas velocity through the chamber, and to insure uniform, smooth pickup of the solids.

The engagement device may be disposed for upward (vertical or inclined) flow of the gas through the engagement chamber, with the gas inlet situated at a lower part thereof, or for horizontal flow, with the gas inlet situated to one side thereof, in the latter case it is desirable to locate the solids inlet at or near the top of the chamber and to mount the diffusion plate beneath the solids inlet at an inclination to the direction of gas flow. The term "flow area" is used to denote the area of the gas stream measured in a plane that is normal to the direction of flow. When the plate is inclined its area must be equal to the product of the specified flow area and the secant of the angle of inclination.

The invention will be further described with reference to the accompanying drawing forming a part of this specification and showing by way of example certain preferred embodiments, wherein:

Figure 1 is a diagrammatic elevation view of a portion of a catalytic conversion plant to which the invention may be applied;

Figure 2 is a vertical sectional view of one form of engagement device;

Figure 3 is a sectional view taken on the line 3—3 of Figure 2;

Figure 4 is a vertical sectional view of a second form of engagement device;

Figure 5 is a vertical sectional view of a third form of engagement device; and

Figure 6 is a sectional view taken on the line 6—6 of Figure 5.

Referring to Figure 1, there is shown a portion of a catalytic cracking plant of the type shown in the aforesaid U.S. Patent No. 2,663,675, it being understood that this is merely illustrative of one of many installations in which the engagement device may be applied. The plant includes a cracking reactor 10, a stripper 11 and a regenerator 12. Regenerated, finely-divided catalyst is removed from the regenerator through a standpipe 13, having a control valve 14, and engaged in an engagement chamber 15 by heated hydrocarbon vapors to be cracked which are admitted at 16. The hydrocarbon vapors, which constitute the solids-conveying gas, carry the catalyst through a transport duct, embodied as a riser pipe 17, into the reactor 10 to which additional hydrocarbon vapors may be admitted at 18 to maintain a fluidized bed 19. Reaction products are withdrawn at 20. Catalyst is discharged from the reactor through a duct 21 to the stripper 11 wherein it is stripped of occluded and adsorbed hydrocarbons by steam or other gas admitted at 22, the vapors being returned to the reactor by a duct 23 and the catalyst being discharged at the bottom through a standpipe 24 having a valve 25. The catalyst is fed to a second engagement chamber 26 to which air is admitted at 27, the air in this being the solids-conveying gas. The resulting suspension flows through a transport duct, embodied as a riser pipe 28, to the regenerator 12. To avoid overheating in the regenerator a portion of the catalyst may be continuously withdrawn by a standpipe 29, having a value 30, and supplied to a third engagement chamber 31, in which it is engaged by air, admitted at 32, for flow as a suspension through a transport riser 33 which passes through a cooler 34 and returns the cooled catalyst to the regenerator at 35. Air and combustion products are discharged at 36. For further details of the system, reference is made to the aforesaid patent.

To attain a pressure balance the standpipe 29, which contains catalyst in a denser state than the riser 33, must have a height equal to or greater than that which produces therein a pressure drop corresponding to the total pressure drop in the engagement chamber 31 and the riser. It is evident that if the pressure drop in the engagement zone (including the chamber 31 and the lower portion of the riser 33) is reduced it becomes possible to decrease the height of the standpipe. A like relationship exists between the other standpipes and risers, e.g., between the standpipe 13 and riser 17, although connected to different vessels.

Referring now particularly to Figures 2 and 3, there is shown one embodiment of an engagement device, which may be used, for example, as the engagement chamber 31. It includes an upright enclosed chamber 37 the upper section 38 of which may be slightly convergent toward the top, having top and bottom closure walls 39 and 40; a solids inlet pipe 41 communicating at the side of the chamber; a transport pipe 42 extending through the top wall 39 and provided with a flared or frusto-conical entrance section 43; a gas inlet pipe 44 communicating with the bottom through an opening in the bottom wall 40; and means for distributing the gas flow, embodied as a plate 45 mounted in a cylindrical ferrule 46 and having a plurality of restricted passages, such as holes or openings 47 distributed over the plate area. It is preferred to provide a slightly higher concentration of holes 47 near the edge of the plate 45 than at the central part thereof, as shown. The plate 45 is aligned with the transport duct entrance section 43. The ferrule 46 provides a space 48 for distribution of the gas when, as in this instance, the gas supply pipe is of smaller diameter. The area of the plate 45 is slightly greater than that of the transport tube 42. The holes 47 are made small enough to insure distribution of the air for substantially uniform flow over the plate area and insure regular pickup of solids. The aggregate open area of the plate is advantageously from about 2 to 80% of the total area. The open area is selected to present an obstruction which is sufficient to create such a pressure drop in the gas as to cause the gas to flow substantially uniformly over the area of the holes. When the conditions are such as to create low pressure drop, as when the gas velocity is low and/or the passages defined by the holes are short and/or large, the diffuser is constructed to present high obstructions, such as 80 to about 98% while lower obstructions, down to about 20%, may be used when conditions tend to create high pressure drop.

As connected, for example, to the system shown in Figure 1, the inlets 41 and 44 would be connected to the standpipe 29 and air inlet 32, respectively, and the transport duct 42 would be the riser 33.

In operation, solids fall by gravity from the inlet 41 into the chamber 37 in which they are picked up by gas admitted through the inlet 44 and discharged through the openings 47 substantially uniformly over the area of the plate. The somewhat larger number of holes near the edge of the plate 45 assists in maintaining such uniform flow despite the effect of the solids, which at first engage the peripherally outer part of the gas stream. This uniform flow results in a smooth and regular engagement of the solids to form a suspension which flows upwards through the convergent section 38 and the flared mouth 43 of the transport tube 42.

In the variant shown in Figure 4 the engagement chamber 49 is an upright cylinder of circular cross section equal in area to the transport tube 50, and also has a solids inlet tube 51 communicating with the side of the chamber. The gas inlet pipe 52 is connected at the bottom, beneath a perforated diffusion plate 53 having openings 54, arranged as described for the openings 47. The plate 53 is spaced from the gas inlet pipe 52, when, as shown, the latter is of reduced diameter to provide a distributing chamber 55. Operation and installation of this device are as was described for Figures 2 and 3.

Figures 5 and 6 show a variant which may be used, for example, as the engagement chamber 15 or 26, in that the gas flow is horizontal. This arrangement includes a horizontal cylindrical enclosed engagement chamber 56 communicating at the left with the transport duct 57, the chamber being circular in cross section and equal in area to the transport duct. A solids inlet pipe 58 communicates with the top of the chamber and a gas supply pipe 59 communicates with the right end of the chamber, being disposed coaxially with the entrance to the transport duct. The chamber 56 contains an inclined transverse diffusion plate 60 having openings 61 distributed over the area thereof and situated beneath the solids inlet 58. Optionally, although preferably, the plate carries deflection vanes 62 which project horizontally toward the transport duct 57 and may be inclined downwardly toward the sides as indicated in Figure 6. These vanes afford a free space for the uniting of the gas streams issuing from the openings 61, to promote a gas current that is moving uniformly over the cross section of the chamber.

As connected, for example, to the system shown in Figure 1, the inlets 58 and 59 are connected to or form the ends of the standpipe 13 and the hydrocarbon feed pipe 16, respectively (or the standpipe 24 and the air inlet pipe 27), and the transport duct 57 is connected to or forms the ends of the riser 17 (or the riser 28). Operation is as was described for Figures 2 and 3 with the change that the gas flows horizontally and effects a smooth pickup of the solids that fall into the chamber 56.

EXAMPLE I

The effectiveness of the diffusor engagement device according to the invention in reducing pressure drop in vertical transport ducts is shown by the following experimental data, wherein three different engagement devices were, in successive runs, used to engage the same finely divided solids in a solids-conveying gas stream at the bottom of the conduit. Neither the eductor nor the nozzle type had diffusors; in the former the gas inlet pipe 44 (see Figure 2) extended slightly into the end of the entrance section 43, which had convergent and divergent sections; in the latter the section 43 was shaped as shown in the drawing and the gas inlet pipe terminated in a nozzle aligned therewith and of smaller diameter than the transport duct. The diffusor type was constructed in accordance with the invention, as shown in Figures 2 and 3.

In all runs gas was passed at a rate of 26 lbs. per minute; two different rates of solids feed were used in two series of runs. The pressure drop through the engagement section (the lowermost five feet of the transport pipe 42, immediately above the engagement device), was measured for each run. The results were as given in Table I:

*Table I*

| Run No. | Type of Engagement Device | Solids Feed Rate, lbs. per min. | Pressure Drop, lbs. per sq. ft. |
|---|---|---|---|
| 1 | Eductor | 800 | 162.8 |
| 2 | Nozzle | 800 | 54.3 |
| 3 | Diffusor | 800 | 41.2 |
| 4 | Eductor | 2,000 | 512.9 |
| 5 | Nozzle | 2,000 | 147.6 |
| 6 | Diffusor | 2,000 | 131.1 |

The decreased pressure drops attained in Runs 3 and 6, in comparison with the other runs at like flow rates, are evident.

EXAMPLE II

The effectiveness of the diffusor engagement device in horizontal transport ducts is shown by the following experimental data, comparing a T-type diffusor (similar to Figure 5, but without the plate 60 and vanes 62) with the engagement device shown in Figures 5 and 6. The gas rate was 8 lbs. per min. in all runs, and the pressure drop through the engagement section (the first five feet of the transport duct) was found to be as stated in Table II:

*Table II*

| Run No. | Type of Engagement Device | Solids Feed Rate, lbs. per min. | Pressure Drop, lbs. per sq. ft. |
|---|---|---|---|
| 7 | "T" | 700 | 2.5 |
| 8 | Diffusor | 700 | 1.2 |
| 9 | "T" | 1,000 | 2.0 |
| 10 | Diffusor | 1,000 | 1.0 |

Again the decreased pressure drops attained in Runs 8 and 10, in comparison with the corresponding runs at like flow rates, are evident.

This application is a continuation-in-part of application No. 512,204, filed May 31, 1955 and now abandoned.

We claim as our invention:

1. Apparatus for transporting finely-divided solids by means of a solids-conveying gas comprising: an enclosed engagement chamber, a transport duct communicating terminally with one end of said chamber, a gas inlet duct connected terminally with the other end of said chamber and directed to supply gas into the chamber in a direction toward the transport duct, said engagement chamber including a generally tubular enclosing wall extending continuously from the gas inlet duct to the transport duct, a solids inlet pipe opening into said chamber in a downward direction through an opening in said enclosing wall situated between said gas inlet and transport ducts for feeding solids to the chamber by gravitation, and a diffusion element situated within said chamber between said gas inlet duct and the said opening in the enclosing wall, said element providing a flow obstruction extending over between about 20% and about 98% of the cross sectional area of the diffusion element and a plurality of restricted flow passages therethrough distributed substantially uniformly over said area, said obstruction being great enough to create a pressure drop in the gas sufficient to distribute the gas flow substantially uniformly over a flow area that is equal to at least a major part of the cross sectional area of the transport duct.

2. Apparatus according to claim 1 wherein the cross sectional area of the engagement chamber is at least equal to that of the transport duct and not over twice the area of the transport duct.

3. Apparatus according to claim 2 wherein the cross sectional area of the engagement chamber is substantially equal to that of the transport duct.

4. Apparatus according to claim 1 wherein said diffusion means is a plate extending across the gas inlet duct and having a plurality of openings distributed over the area thereof.

5. Apparatus according to claim 4 wherein the said flow area through which the openings are distributed is between about one-half and twice the cross sectional area of the transport duct.

6. Apparatus according to claim 4 wherein said transport duct extends upwardly from and communicates with the top of the engagement chamber, the gas inlet duct is connected at the bottom, and the solids inlet pipe communicates with the chamber at the side thereof at an inclination to the vertical.

7. Apparatus according to claim 4 wherein said transport and gas inlet ducts are disposed substantially coaxially and extend laterally from said engagement chamber in opposite directions, the solids inlet pipe communicates with the chamber at an upper part thereof, and the said plate is inclined and situated beneath said solids inlet pipe.

8. Apparatus according to claim 7 wherein said plate has deflection vanes extending therefrom in a direction toward the transport duct.

References Cited in the file of this patent

UNITED STATES PATENTS

| 2,304,827 | Jewell | Dec. 15, 1942 |
| 2,527,455 | Schemm | Oct. 24, 1950 |
| 2,586,705 | Palmer | Feb. 19, 1952 |
| 2,673,764 | Cummings | Mar. 30, 1954 |
| 2,793,914 | Gardeniers | May 28, 1957 |

FOREIGN PATENTS

| 1,074,419 | France | Mar. 31, 1954 |